United States Patent [19]

Schwab et al.

[11] Patent Number: 5,260,039

[45] Date of Patent: Nov. 9, 1993

[54] PROCESS FOR THE TWO-PHASE EXTRACTION OF METAL IONS FROM PHASES CONTAINING SOLID METAL OXIDES, AGENTS AND THE USE THEREOF

[75] Inventors: Werner Schwab, Langenfeld; Ralf Kehl, Duesseldorf, both of Fed. Rep. of Germany

[73] Assignee: Hendel Kommanditgesellschaft auf Aktien, Duesseldorf, Fed. Rep. of Germany

[21] Appl. No.: 776,230

[22] PCT Filed: May 7, 1990

[86] PCT No.: PCT/EP90/00734

§ 371 Date: Nov. 12, 1991

§ 102(e) Date: Nov. 12, 1991

[87] PCT Pub. No.: WO90/13675

PCT Pub. Date: Nov. 15, 1990

[30] Foreign Application Priority Data

May 12, 1989 [DE] Fed. Rep. of Germany ....... 3915586

[51] Int. Cl.$^5$ ............................................... C22B 3/16
[52] U.S. Cl. ........................................ 423/24; 423/49; 423/54; 423/63; 423/87; 423/98; 423/109; 423/112
[58] Field of Search ..................... 423/24, 49, 54, 63, 423/87, 98, 109, 112

[56] References Cited

U.S. PATENT DOCUMENTS

3,936,494 2/1976 Lipowski ............................... 423/24

FOREIGN PATENT DOCUMENTS

0043919 1/1982 European Pat. Off. .
283740 9/1988 European Pat. Off. .
2273583 1/1976 France .

OTHER PUBLICATIONS

Chemical Abstracts vol. 99 No. 12, 94231v 1983.

*Primary Examiner*—Melvyn J. Andrews
*Attorney, Agent, or Firm*—Ernest G. Szoke; Wayne C. Jaeschke; Patrick J. Span

[57] ABSTRACT

A process is disclosed for the two-phase extraction of metal ions from phases containing solid metal oxides, which is characterized in that the solid metal oxides are brought into contact with a hydroxamic acid, known per se, dissolved in a hydrophobic organic solvent, the phases containing the solid metal oxides and the organic phase are intensively intermixed over a sufficient contact time, after phase-splitting, the organic phase is separated and the metal ions are re-extracted from the organic phase in a manner known per se and processed.

The extracting agent used therein and the use of this extracting agent are also disclosed.

20 Claims, No Drawings

PROCESS FOR THE TWO-PHASE EXTRACTION OF METAL IONS FROM PHASES CONTAINING SOLID METAL OXIDES, AGENTS AND THE USE THEREOF

BACKGROUND OF THE INVENTION

1. Field of the Invention

The present invention relates to a process for the two-phase extraction of metal ions from phases containing solid metal oxides by means of a hydroxamic acid dissolved in an organic solvent. The present invention also relates to an agent for the extraction of metal ions from phases containing solid metal oxides. Finally, the present invention relates to the use of hydroxamic acids as agents for the extraction of metal ions from phases containing solid metal oxides.

2. Statement of Related Art

Processes for the selective extraction of metal ions from aqueous solutions with the aid of a hydroxamic acid dissolved in an organic solvent are known from the prior art.

According to DE-PS 22 10 106, using a hydroxamic acid of the general formula (A)

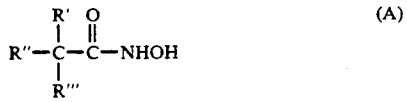

in which the radicals R represent alkyl radicals, and in which the total number of carebon atoms in the molecule is greater than 10, transition metals are extracted from the partly radioactive, aqueous solutions from uranium-processing plants.

According to U.S. Pat. No. 3,464,784, the vanadium is extracted from aqueous solutions containing tetravalent vanadium with the aid of organosoluble hydroxamic acids of the general formula (B)

in which R can represent alkyl, cycloalkyl or aryl radicals with 7 to 44 carbon atoms, preferably so-called "neo-alkyl radicals", which contain a quaternary carbon atom next to the carbonyl group.

"J. Chem. Research" (S) 1982, 90 ff, in addition, describes the solvent-extraction of transition metals with so-called versatohydroxamic acids of the above general formula (B), in which the radicals R are branched alkyl radicals containing 10 to 15 carbon atoms. The solvent-extraction with trialkylacethydroxamic acid of various metal isotopes from aqueous solutions from plants processing radioactive residues is described in "Reprints of the ISEC '86", Sep. 11–16, 1986, Munich, p. 355–362.

The processes described above, however, are solvent-extractions or liquid-liquid extractions, i.e. extraction processes in which the metal ions to be extracted are already in solution.

The separation of impurities from precious-metal electrolyte solutions by means of a two-phase liquid-liquid extraction is also known. The impurities arsenic, antimony, bismuth and iron are, for example, separated from aqueous, mineral-acid copper-electrolyte solutions with hydroxamic acids used as extracting agents. In this prior art, separation is effected by a liquid-liquid extraction, in which the impurities to be removed, which are in a dissolved form in the strongly acidic solution, are extracted in the organic phase.

The German Patent Application P 37 25 611.4 published on Feb. 9, 1989, for example, relates to a process for the simultaneous separation of arsenic, antimony, bismuth and iron from precious-metal electrolyte solutions by means of solvent extraction and the subsequent recovery of the named impurities, which is characterized in that aqueous, mineral-acid precious-metal electrolyte solutions are added to a poorly water-soluble organic solvent which contains one or more hydroxamic acids, the two phases are mixed together intensively, the impurities arsenic, antimony and bismuth are precipitated from the organic phase by sulfide-precipitation, the sulfides are separated off and the iron remaining in the organic phase is then re-extracted with a water-soluble complexing agent for iron into an aqueous phase and recovered.

The German Patent Application P 38 36 731.9 published on May 3, 1990 relates, further, to a process for the separation of impurities selected from arsenic, antimony, bismuth and/or iron from precious-metal electrolyte solutions by means of solvent-extraction and subsequent recovery of the named impurities, in which an aqueous, mineral-acid precious-metal electrolyte solution is added to a poorly water-soluble organic solvent containing one or more hydroxamic acids, the two phases are mixed together intensively, arsenic, antimony and bismuth are precipitated from the organic phase by sulfide-precipitation, the sulfides are separated off and the extracted iron is then re-extracted with a water-soluble complexing agent for iron into an aqueous phase and recovered, which is characterized in that prior to the sulfide precipitation, the organic phase is re-extracted with water over a sufficient contact time, the arsenic and/or antimony re-extracted into the water phase are optionally precipitated out by reduction in a manner known per se and processed.

Depending on the nature and composition of such precious-metal electrolyte solutions, the impurities, which are present in most cases as metal oxides before they are processed, can, however, also be undissolved in a solid form, i.e. suspended in the mineral-acid solution. In particular, solutions from refining electrolysis, especially those from copper-refining electrolysis, can contain impurities in the form of finely-dispersed solids. To carry out the solvent-extraction according to the prior art, however, clear electrolyte solutions without any suspended solids content are required. In the past, therefore, such solids have been removed from the electrolyte solutions, e.g. by filtration.

The elements arsenic, antimony and bismuth in the form of their metal oxides frequently also occur in the secondary streams of different processes, for example, in the smelting of the base metals copper, lead or iron. Such secondary streams can be: flue dusts, slags, metal sludges, $SO_2$-roaster gases, which are subjected to wet-cleaning, or certain wash-waters, which are finally treated in subsequent effluent-cleaning stages. Separation usually takes place via the corresponding oxides. For final storage in "special-refuse" dumps, conversion into poorly soluble compounds is required, in particular in the case of arsenic in the form of calcium arsenates or basic iron arsenates. For ecological reasons and due to the ever more restricted dumping space—which ultimately causes increases in the costs of special-refuse dumping—, for a number years more and more metallurgical products have been subjected, for example, to "de-arsenification".

In the future, more and more crude ores with higher contents of impurities, particularly arsenic, will be processed. As a result, the amounts of $As_2O_3$ to be removed from the $SO_2$-roaster gases in smelting-metallurgical processing will increase sharply (literature: The Aqueous Chemistry of Arsenic in Relation to Hydrometallurgical Processes, R. G. Robins, CIM Meeting, Vancouver, August 1985, p. 1 to 26). The wet-cleaning of $SO_2$-roaster gases containing $As_2O_3$ takes place with water and/or $H_2SO_4$ acid solutions in washing towers. Arsenic is precipitated from such wash-waters, for example, with lime. Since, however, the wash liquors are strongly acidic and contain many contaminants, the chemical consumption is high and the product is unclean. Making safe, utilizing or storing such arsenic-containing products constitutes a technical-economic problem. This also applies to the elements bismuth and antimony.

The problems are not limited only to the separation of these elements as "impurities". They are undesirable as impurities because they downgrade the quality of the "pure" metals produced mainly by refining and are also questionable from the ecological viewpoint. At the same time, the aforementioned secondary streams in the smelting processes of base metals are also important raw-material sources for obtaining these metals, which are put to use in various fields (electronics, optics, catalyst technology, as alloy constituents). As couple products, those oxides in particular are important, which form during the smelting of crude ores, for example: $As_2O_3$ from roaster gases after wet-cleaning in copper, lead and iron smelting; $Sb_2O_3$ from roaster gases after wet-cleaning, Sb-reclamation in lead works is particularly important, as is the reclaiming of heavy metals in subsequent pyro-metallurgical, wet and electrochemical refining processes; $Bi_2O_3$ particularly from lead and copper smelting.

Processes are therefore sought which on the one hand separate off impurities such as, for example, As, Sb and Bi and thus minimize environmental impact and improve the product quality of the base metals produced, but which on the other hand also return these impurities to the economic cycle as useful materials (recycling). The problems described above are not, however, limited exclusively to the named elements As, Sb and Bi. They rather refer in addition to a number of other metals which occur in numerous processes in the oxide form as side constituents. Here too there is an urgent desire to be able to reclaim these metals and likewise to recycle them for further use.

To recover or reclaim any of these metals by means of a solvent-extraction process, according to the prior art it was hitherto always necessary first to bring the existing metal oxides into solution, which required the use of large volumes of treatment agents, especially mineral acids. These treatment agents then also had to be re-processed or disposed of.

DESCRIPTION OF THE INVENTION

In contrast of this, the purpose of the present invention, in view of the described prior art, is therefore to provide a simple and low-cost process for the extraction of metal ions from phases containing solid metal oxides, which enables the separation of these metal ions to be carried out in a technically uncomplicated manner, and in which the phases containing solid metal oxides, which are to be processed, i.e., natural raw materials or products and secondary streams of different processes, can be supplied directly, i.e., for example, without being previously dissolved, to the process for the extraction of metal ions.

It was surprisingly found that with the aid of hydroxamic acids which were known per se, preferably neoalkylhydroxamic acids, in the organic phase not only aqueous or mineral-acid solutions, but even phases containing solid metal oxides, i.e., phases containing suspended or even powder-form solid metal oxides, can be extracted such that the metal ions are transferred into the organic phase.

The present invention consequently relates to a process for the two-phase extraction of metal ions using hydroxamic acids of general formula (I)

in which R represents a straight-chain or branched, saturated or unsaturated alkyl radical with 5 to 21 carbon atoms, a cycloalkyl radical with 5 to 7 carbon atoms which is unsubstituted or substituted with $C_{1-6}$-alkyl groups, or a phenyl radical which is unsubstituted or substituted with $C_{1-12}$-alkyl groups, characterized in that solid, finely divided metal oxides of metals of main group III to V and of sub-group I, II and IV to VIII of the periodic system, which are present either in a solid phase as such or are dispersed in a non-dissolved form in a liquid phase, are brought into contact with an inert, organic solvent, which is only slightly miscible with water and contains at least one hydroxamic acid of the general formula (I) dissolved in an amount sufficient for the extraction of the metal ions, the phase containing the solid metal oxides is intensively intermixed with the organic phase containing the hydroxamic acids(s) for a contact time sufficient for the extraction of the metal ions, after this the organic phase is separated and the metal ions contained therein are re-extracted in a manner known per se and processed.

In the following, the definition of the metal oxides to be extracted by means of the invention process firstly includes the oxides of the following main-group elements: gallium, indium, thallium, germanium, tin, lead, arsenic, antimony and bismuth. This definition also includes the oxides of the sub-group elements copper, silver, zinc, cadmium, mercury, titanium, zircon, hafnium, vanadium, niobium, tantalum, chromium, molybdenum, tungsten, manganese, technetium, rhenium, cobalt, nickel, ruthenium, rhodium, palladium, osmium, iridium and platinum.

These metal oxides can on the one hand be constituents of natural raw materials, but on the other can also be products, by-products or waste products of different processes.

In the context of the present invention it is important that these metal oxides are in a solid, i.e. not in a dissolved, form. These metal oxides can then be subjected to the extraction process as such in the solid phase, i.e. without any additives. A second variant of the process according to the invention provides for these solid metal oxides to be dispersed in a liquid phase, and to be subjected thus to the extraction process. As the liquid phase, the following can be used: water, mineral acids, for example, sulfuric acid, hydrochloric acid, nitric acid or phosphoric acid, or organic solvents. Of the named mineral acids, sulfuric acid is preferred. For use as the organic solvents which can be used for the dispersion of the solid metal oxides, those solvents are to be considered which are in any case used in conjunction with the extracting agent hydroxamic acid in the extraction process. More details regarding this can be found elsewhere. The solid metal oxides should be subjected to the extraction process in the most finely divided form possible, i.e. preferably in powder form. The extraction process according to the invention can naturally also be carried out with coarser particles of solid metal oxides, but as a result the extraction time is unnecessarily lengthened and the extraction result reduced. "Finely divided" in the sense of the invention means therefore that the solid metal oxides offer the largest possible surface area.

The first stage of the process according to the invention is for the phases containing the solid metal oxides to be mixed with a slightly water-soluble organic solvent, which contains one or more hydroxamic acids, known per se, of the general formula (I),

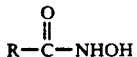

(I)

in which R represents a straight-chain or branched, saturated or unsaturated alkyl radical with 5 to 21 carbon atoms or a cycloalkyl radical with 5 to 7 carbon atoms which is unsubstituted or substituted with $C_{1-6}$-alkyl groups, or a phenyl radical which is unsubstituted or substituted with $C_{1-12}$-alkyl groups.

The following compounds can be considered, by way of example, for use as the inert organic solvents which are poorly water-miscible or are soluble therein: aliphatic, cycloaliphatic or aromatic hydrocarbons or mixtures thereof with a high boiling point, chlorinated hydrocarbons, ketones or ethers with a high boiling point or also mixtures of such compounds. These organic solvents should be "inert", i.e. they should not enter any chemical reaction with the hydroxamic acids used as the extracting agents, with the metal oxides to be extracted or with the mineral acids used in some cases. These solvents should be only slightly miscible with water, so that after the extraction has been carried out an optimal separation of the organic phase from the optionally present aqueous or mineral-acid phase is possible. They should in addition be non-volatile and high-boiling and their flash points should be as high as possible, >80° C., preferably >100° C. Preferably, as known from the prior art, kerosenes or mixtures thereof are used as the poorly water-soluble or poorly water-miscible organic solvents.

The hydrophobic character of the organic solvent also determines to a large extent the nature of the extractants contained in this solvent. A hydroxamic acid of the general formula (I) or a mixture of several such hydroxamic acids functions as such. The radical R in the above general formula can represent straight-chain alkyl radicals from the group containing pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl or uneicosyl. It is, however, also possible for R in the above general formula (I) to represent the branched-chain isomers of the named straight-chain alkyl radicals. Correspondingly, in place of the saturated alkyl radicals there can also be unsaturated alkyl radicals, which can equally be straight-chained or branched. Cycloalkyl radicals with 5 to 7 carbon atoms, i.e., cyclopentyl, cyclohexyl or cycloheptyl are also possible as the radicals R. Such cycloalkyl radicals can also be substituted with one or more straight-chain or branched, saturated alkyl groups with 1 to 6 carbon atoms. Such radicals also come into consideration as substituted cycloalkyl radicals as are known from naphthenic acids (here linked with a carboxyl group). The radical R can moreover also signify an unsubstituted or substituted phenyl radical. One or more straight-chain or branched, saturated alkyl groups with 1 to 12 carbon atoms can be considered here as substituents.

Preferably, hydroxamic acids of the general formula (I) are used as extractants, in which R represents branched, saturated alkyl radicals with 5 to 21 carbon atoms, preferably branched, saturated alkyl radicals with 7 to 19 carbon atoms.

Due to the requirement discussed above that the hydroxamic acid or acids used as the extractant(s) must dissolve as well as possible in the organic solvent and have the necessary stability in this solvent, with particular advantage one or more hydroxamic acids of the general formula (I) are used in which R represents so-called neo-alkyl radicals of the general formula (II)

(II)

in which the sum of the number of the carbon atoms in the alkyl radicals $R^1$, $R^2$ and $R^3$ is from 6 to 18. As the radical R, the numerous different isomeric radicals from the group containing neo-heptyl, neo-octyl, neo-nonyl, neo-decyl, neo-undecyl, neo-dodecyl, neo-tridecyl, neo-tetradecyl, neo-pentadecyl, neo-hexadecyl, neo-heptadecyl, neo-octadecyl and neo-nonadecyl, are possible. The individual meanings of the radicals $R^1$, $R^2$ and $R^3$ is of less importance in this context, provided that each of the named radicals has at least 1 carbon atom. Such neo-alkyl radicals ensure optimal solubility and stability in the organic solvent of the hydroxamic acids of the general formula (I) used as the extractant.

The hydroxamic acids of the general formula (I) used in the process according to the invention can be produced according to processes known from the prior art. For example, according to DE-PS 22 10 106 the corresponding carboxylic acid can be converted by reaction with an excess of $SOCl_2$ into the corresponding acid chloride and then reacted with hydroxylamine to form hydroxamic acid of the general formula (I). Correspondingly, (cf. J. Chem. Research (S) 1982, 90) the reaction of carboxylic acid ester and its subsequent reaction with hydroxylamine to form the corresponding hydroxamic acid of the general formula (I) is also possible. Other processes known from the prior art can, however, also be used for the production of such compounds (I).

As already mentioned, for the implementation of the process according to the invention in particular those hydroxamic acids of the general formula (I) have proved useful in which R represents neo-alkyl radicals of the general formula (II). Such hydroxamic acids (I)

can be produced according to the processes described above from the products obtainable from the company Shell Chemical Corporation under the trade name Versatic ®-acids. They contain, in one case, in the molecule of the general formula (I) at the position marked R, a neo-alkyl radical of the general formula (II), in which the sum of carbon atoms in the radicals $R^1$, $R^2$ and $R^3$ is 8, in the other case, such compounds (I) in which the radical R represents neo-alkyl radicals of the general formula (II), in which the sum of the carbon atoms in the radicals $R^1$, $R^2$ and $R^3$ is from 7 to 17. Such products represent an industrial mixture of hydroxamic acids of different chain-lengths. They make possible the use thereof as an extracting reagent which has optimal properties for the desired applications, i.e., is not only very easily soluble and stable in the organic phase, but can also be reversibly charged with the above metal ions. Apart from this, such organic phases containing hydroxamic acids have a viscosity in a range such as to ensure an optimal phase-separation after the intermixing procedure discussed below.

In the present invention, the solid metal oxides are brought into contact with the inert, organic solvent which contains in solution at least one of the hydroxamic acids defined above. The concentration of the hydroxamic acid in the solvent should here be such as to be sufficient for the extraction of the metal ions from the solid metal oxides. In general, the optimal amount of extraction agent for each individual case can be determined easily by tests. The amount of extractant in the organic phase is, however, limited by the fact that with high concentrations of the hydroxamic acids in the organic phase, the viscosity increases so greatly during charging with the metal ions that in a continuous process efficient intermixing of the two phases can no longer be ensured. In addition, the separation of the organic from the aqueous phase is made considerably more difficult as viscosity increases. It is therefore preferred in the invention to use organic solvents such as kerosenes or mixtures thereof in the process according to the invention, which contain one or more hydroxamic acids of the general formula (I) in a concentration of 0.01 to 2.0 mol/l of solvent, preferably in a concentration of 0.1 to 1.0 mol/l of solvent.

The temperature at which the two phases are brought into contact with each other, is usually in a range in which the extracting reagent cannot decompose, and therefore temperatures above 80° C. should not be used. On the other hand, when there are high concentrations of hydroxamic acid in the organic phase and large amounts of metal oxides to be extracted, the temperature should be selected so that the viscosity of the phases is not too great. In these cases the lower temperature value selected should not be less than 5° C.

The second stage of the process according to the invention is for the phase containing the solid metal oxides and the organic phase to be intensively intermixed for a sufficient contact time. The contact time of the two phases is one of the parameters which determines the amount of metal ions extracted. When there is a fixed extracting agent concentration, the amount of metal ions extracted generally rises as the contact time increases. The contact time sufficient for the extraction of the metal ions is naturally influenced primarily by the amount of metal ions to be extracted. In other words, for larger amounts of metal oxides, the contact times selected must be correspondingly long. In general, the optimal contact time for any given individual case can easily be determined by preliminary tests.

The two phases are then mixed intensively together at a temperature in the above range. Any of the devices which can generally be used for liquid-liquid extractions can be considered here for use as mixing devices.

Consequently, for example, mixing columns, centrifuges, conventional mixing vessels or even a so-called "mixer-settler" can be used for the process according to the invention. Mixer-settlers are used in particular in liquid-liquid extractions and are adequately described in the relevant prior art. As regards the mixing device used in the process according to the invention it is merely important that it ensures a sufficiently good intermixing of the phase containing the solid metal oxides with the organic phase.

As already discussed above, the metal oxides are used for the extraction process either as such in the solid phase or dispersed in a liquid phase. In the invention it is preferred here that water and/or a mineral acid, preferably sulfuric acid, is used as the liquid phase. In which of the above phases the metal oxides are actually used in the process according to the invention, i.e. whether they are used as such in the solid phase or dispersed in an aqueous or mineral-acid phase, depends on the respective metal oxide and can easily be determined in individual cases by tests. In principle, it is possible with the process according to the invention to extract all the aforementioned metal ions into the organic phase from a powder-form phase containing solid metal oxides. In many cases it has, however, proved advantageous to disperse the solid metal oxides in water or a mineral acid, i.e. a liquid phase. The ratio of organic phase to liquid phase, also termed O/A-ratio below, is usually uncritical and can in any case be set to an optimal value by tests. When using water or sulfuric acid for the liquid phase in which the solid metal oxides are dispersed, it has proved advantageous in the invention to select an O/A-ratio of 1:1.

In a preferred embodiment of the present invention the oxides of arsenic, antimony, bismuth, lead, germanium, cadmium, mercury, copper, molybdenum, vanadium, manganese and/or indium, existing as such in the solid phase, can be used as metal oxides for the extraction process.

In another preferred embodiment of the present invention, the above metal oxides, present in dispersion in the aqueous phase, are used as metal oxides for the extraction process.

In a third preferred embodiment of the present invention, the oxides of arsenic, antimony and/or bismuth, dispersed in a mineral-acid phase, are used as the metal oxides for the extraction process.

As already discussed above, different extraction results can be obtained with a specific metal oxide depending on the phase in which it is mixed with the organic phase. This also applies for the above preferred embodiments of the invention.

For example, arsenic oxide exhibits a somewhat different behaviour depending on the quantity of the water or acid added compared to the oxides of antimony or bismuth. Arsenic trioxide is preferably extracted in a high quantity without the addition of water or acid—i.e. in the solid state. In the case of antimony oxide and bismuth oxide, water or the addition of a weak acid generally promotes the extraction. However, lead(II) oxide, and equally lead(II,IV) oxide, is extracted both from a solid and from a purely aqueous suspended phase, i.e. a non-acidified phase. Likewise, germanium oxide, cadmium oxide, mercury(II) oxide, copper(I) oxide, molybdenum oxide, vanadium oxide, manganese oxide and indium oxide are extracted both from the solid and from a purely aqueous suspended phase.

The ability of the hydroxamic acids to extract metal oxides in solid or suspended form, is particularly advantageous for the separation of specific metal ions from precious metal electrolyte solutions, particularly from copper-refining electrolyte solutions. Accordingly, a further preferred embodiment of the present invention relates to the extraction of the oxides of arsenic, antimony and/or bismuth which are present in dispersed form in sulfuric-acid copper-refining electrolyte solutions. An efficient filtration of the precious-metal electrolyte solution which was previously absolutely necessary prior to the application of a solvent-extraction is therefore no longer required. Advantageously, the process according to the invention can therefore be used, when metal oxides are present in suspended form, i.e. as impurities, to increase the amount of metal ions extracted still further. As a result, the amount of anode sludge, which forms continually during the electrolysis and is usually processed separately due to the noble metals contained therein, is ultimately also reduced.

The hydroxamic acids' property of extracting metal ions even from metal oxides which are in a solid or suspended form, can also be used advantageously for the extraction of metal oxides which derive from the many and varied secondary process streams mentioned above, for example, from $SO_2$-roaster gases, flue dusts, slag, sludges or wash-waters. The "bringing into solution" which takes place before a conventional solvent-extraction using large volumes of digesting agents (usually mineral acids) is not necessary. Instead, in some cases the addition of small amounts of water or weak mineral acids, which simply have the function of suspending the metals which are usually present in oxidic form, is sufficient. The extracting reagent (hydroxamic acid) contained in an inert organic solvent (preferably kerosene) can therefore be brought into direct contact with the metal oxides to be extracted from the respective secondary process stream.

In a subsequent third stage of the process the organic phase, which contains the extracted metal ions, is separated from the other phase, and the metal ions are re-extracted from the organic phase in a manner known per se.

This re-extraction of the metal ions from the organic phase takes place in a manner known per se according to the processing methods of the prior art. In the sense of the present invention, it is particularly preferred that, for the re-extraction and processing of the extracted metal ions, the organic phase is mixed with a sulfide-precipitation agent and the precipitated metal sulfides are then separated, water preferably being added to the organic phase before the sulfide precipitation. This type of re-extraction or processing is described in detail in the German Patent Applications P 37 25 611.4 and P 38 36 731.9 already cited above. The re-extraction of the metal ions from the organic phase or the processing thereof can, however, also take place according to other processes known per se. One of these, for example, is so-called "stripping" through a pH-reduction by mineral acids, for example, sulfuric acid, or with the aid of water-soluble complexing agents, such as inorganic acids, for example hydrochloric acid or phosphoric acid, or also organic acids, such as oxalic acid or phosphonic acids. Refer here to the relevant prior art.

The present invention relates further to an agent for the two-phase extraction of metal ions from metal oxides which are present either as such in a solid phase, or dispersed, in a non-dissolved form in a liquid phase, containing one or more hydroxamic acids of the general formula (I)

in which R represents a straight-chain or branched, saturated or unsaturated alkyl radical with 5 to 21 carbon atoms, a cycloalkyl radical with 5 to 7 carbon atoms which is unsubstituted or substituted with $C_{1-6}$-alkyl groups, or a phenyl radical which is unsubstituted or substituted with $C_{1-12}$-alkyl groups, dissolved in an inert organic solvent in a concentration of 0.01 to 2 mol/l of solvent.

The present invention relates ultimately to the use of one or more hydroxamic acids, as defined above, as agents for the extraction of metal ions from phases containing solid metal oxides.

The following examples serve to illustrate the invention without however limiting it.

For all the extraction tests, a hydroxamic acid was used as the extracting agent, produced from a commercially available mixture of carboxylic acids of the formula

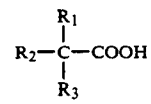

in which the sum of the number of carbon atoms in the alkyl radicals $R_1$, $R_2$ and $R_3$ was between 7 and 17 (Versatic ® 1019 of the company Shell).

The concentration of extractant in the organic phase was 0.5 mol/l of solvent, partly 1.0 molar. The kerosene Escaid ® 100 from the Esso company was used as the organic solvent.

EXAMPLE 1

This example serves to illustrate the extraction of the metal oxides of As, Sb and Bi, suspended in a mineral-acid phase.

For this example, a solution from a copper-refining electrolysis works was used with the following composition in g/l:
12.0 As,
0.03 Bi,
0.52 Sb,
0.3 Fe,
45 Cu,
10 Ni and
160 $H_2SO_4$.

Example A (Comparison) shows the results which were obtained by solvent-extraction of the filtered electrolyte solution which contained no solid metal oxides.

Example B reproduces the results obtained when the same electrolyte solution was used for the extraction with suspended metal oxides (stirred).

An analysis of the suspended solids content, i.e. of the metal oxides, resulted in the following composition (in % by weight).

Solids (isolated and dried):
<0.1 Fe
<0.1 Ni
0.5 Cu
1.2 Bi
19.5 As
48.0 Sb

The analysis confirms that the components As, Sb and Bi are the main constituents in the solids part.

Test Conditions were:

O/A-ratio 1:1 (ratio of the organic to the aqueous phase)

Agitation time 15 min at a temperature of 60° C., and 1 hr at room temperature (i.e. approx. 20° C.), Reagent concentration 0.5 molar and 1.0 molar, i.e. one mole of hydroxamic acid (extractant) per liter of solvent (see Tab. 1).

The organic phase was filtered before the analysis of the metal contents.

TABLE 1

| Electrolyte solution | Agitation time (min) | Temp. (°C.) | Conc. extractant (molar) | Organic phase, extracted amount (g/l) | | |
|---|---|---|---|---|---|---|
| | | | | Sb | Bi | As |
| A | 60 | RT | 0.5 | 0.3 | 0.015 | 6.8 |
| B | 60 | RT | 0.5 | 4.3 | 0.015 | 6.3 |
| A | 15 | 60 | 0.5 | 0.3 | 0.013 | 6.4 |
| B | 15 | 60 | 0.5 | 5.2 | 0.023 | 5.4 |
| A | 15 | 60 | 1.0 | 0.3 | 0.018 | 9.8 |
| B | 15 | 60 | 1.0 | 6.1 | 0.091 | 10.5 |

The results confirm that Sb and Bi in particular are extracted to an increased amount into the organic phase when an electrolyte solution with suspended solid particles is used. This is closely connected with the main constituents determined in the solid (see analysis). The effect is increased further at raised temperature. The As-extraction remains almost constant in this case and to a large extent is from the dissolved phase (see also Example 2). Account should be taken here of the fact that due to the higher temperature and the higher total supply of antimony, a different exchange-kinetic comes into effect, such that—with regard to the charge capacity of the organic phase as a whole—arsenic is partly displaced by antimony. By raising the concentration of the extracting agent or the O/A ratio, if required, the total amount of metal impurities extracted can be increased. This depends on the composition of the refining electrolytes in each case.

EXAMPLE 2

The following tables show the extraction results for pure metal oxides, namely $As_2O_3$, $Sb_2O_3$ and $Bi_2O_3$, under different conditions and with variation of the parameters temperature and contact time, with the addition of water or sulfuric acid in different concentrations, from the suspended phase, and without any added liquid phase (A-phase). If water or acid was not added, the extraction test took place by suspension of the metal oxide directly into the organic phase with vigorous stirring or agitation. When water or sulfuric acid of a certain concentration was added, the suspension of the metal oxide likewise took place in the aqueous or mineral-acid phase and addition of the organic phase in the ratio O/A 1:1. The reagent concentration of the extractant in the solvent was 0.5 molar. The amount of metal oxide $M_2O_3$ used was selected so that the concentration of metal was 10 g/l of organic phase, i.e. solvent plus extractant. The organic phase was filtered before the analysis of the metal contents.

The following tables show the extraction results obtained for the metal oxides $As_2O_3$ (Table 2), $Sb_2O_3$ (Table 3) and $Bi_2O_3$ (Table 4). The percentage figure in the last column in each case refers to the percentage amount of the extracted metal ion referred to the amount used.

TABLE 2

Extraction tests for $As_2O_3$

| O-phase mol/l | A-phase | O/A-ratio | Temp. (°C.) | Duration (min) | g/l extr. As | % extr. As |
|---|---|---|---|---|---|---|
| 0.5 | — | — | RT | 60 | 0.2 | 2 |
| 0.5 | — | — | 60 | 5 | 1.6 | 16 |
| 0.5 | — | — | 60 | 15 | 4.5 | 45 |
| 0.5 | — | — | 60 | 30 | 6.4 | 64 |
| 0.5 | — | — | 60 | 60 | 9.1 | 91 |
| 0.5 | $H_2O$ | 1:1 | RT | 60 | 0.2 | 2 |
| 0.5 | $H_2O$ | 1:1 | 60 | 60 | 4.7 | 47 |
| 0.5 | $H_2SO_4$ (1 g/l) | 1:1 | 60 | 5 | 0.3 | 3 |
| 0.5 | " | 1:1 | 60 | 10 | 0.5 | 5 |
| 0.5 | " | 1:1 | 60 | 15 | 0.8 | 8 |
| 0.5 | " | 1:1 | 60 | 30 | 1.7 | 17 |
| 0.5 | " | 1:1 | 60 | 60 | 2.1 | 21 |
| 0.5 | $H_2SO_4$ (10 g/l) | 1:1 | 60 | 60 | 3.1 | 31 |
| 0.5 | $H_2SO_4$ (150 g/l) | 1:1 | RT | 60 | 0.2 | 2 |
| 0.5 | $H_2SO_4$ (150 g/l) | 1:1 | 60 | 60 | 0.4 | 4 |
| — | $H_2SO_4$ (150 g/l) (blank reading) | — | RT | 60 | 0.8 | 8 (in aqueous phase) |

TABLE 3

Extraction tests for $Sb_2O_3$

| O-phase mol/l | A-phase | O/A-ratio | Temp. (°C.) | Duration (min) | g/l extr. As | % extr. |
|---|---|---|---|---|---|---|
| 0.5 | — | — | 60 | 60 | 0.1 | 1 |
| 0.5 | $H_2O$ | 1:1 | RT | 60 | 0.4 | 4 |
| 0.5 | $H_2O$ | 1:1 | 60 | 60 | 3.8 | 38 |
| 0.5 | $H_2SO_4$ (1 g/l) | 1:1 | 60 | 5 | 1.2 | 12 |
| 0.5 | " | 1:1 | 60 | 10 | 2.1 | 21 |
| 0.5 | " | 1:1 | 60 | 15 | 3.3 | 33 |
| 0.5 | " | 1:1 | 60 | 30 | 5.1 | 51 |
| 0.5 | " | 1:1 | 60 | 60 | 8.1 | 81 |
| 0.5 | $H_2SO_4$ (10 g/l) | 1:1 | RT | 60 | 7.4 | 74 |
| 0.5 | $H_2SO_4$ (50 g/l) | 1:1 | RT | 60 | 9.5 | 95 |
| 0.5 | $H_2SO_4$ (100 g/l) | 1:1 | RT | 60 | 8.9 | 89 |
| 0.5 | $H_2SO_4$ (150 g/l) | 1:1 | RT | 60 | 9.2 | 92 |
| 0.5 | $H_2SO_4$ (150 g/l) | 1:1 | 60 | 60 | 9.8 | 98 |
| — | $H_2SO_4$ (150 g/l) (blank reading) | 1:1 | RT | 60 | 0.7 | 7 (in aqueous phase) |

TABLE 4

Extraction tests for $Bi_2O_3$

| O-phase mol/l | A-phase | O/A-ratio | Temp. (°C.) | Duration (min) | g/l extr. As | % extr. As |
|---|---|---|---|---|---|---|
| 0.5 | — | — | 60 | 60 | 0.05 | 0.5 |
| 0.5 | $H_2O$ | 1:1 | RT | 60 | 0.3 | 3 |
| 0.5 | $H_2O$ | 1:1 | 60 | 60 | 5.1 | 51 |
| 0.5 | $H_2SO_4$ (1 g/l) | 1:1 | 60 | 5 | 6.0 | 60 |
| 0.5 | " | 1:1 | 60 | 10 | 8.8 | 88 |
| 0.5 | " | 1:1 | 60 | 15 | 9.5 | 95 |
| 0.5 | " | 1:1 | 60 | 30 | 9.4 | 94 |
| 0.5 | " | 1:1 | 60 | 60 | 9.0 | 90 |
| 0.5 | $H_2SO_4$ (10 g/l) | 1:1 | RT | 60 | 8.7 | 87 |
| 0.5 | $H_2SO_4$ (50 g/l) | 1:1 | RT | 60 | 9.5 | 95 |
| 0.5 | $H_2SO_4$ (100 g/l) | 1:1 | RT | 60 | 9.0 | 90 |
| 0.5 | $H_2SO_4$ (150 g/l) | 1:1 | RT | 60 | 6.2 | 62 |
| 0.5 | $H_2SO_4$ (150 g/l) | 1:1 | 60 | 60 | 9.8 | 98 |
| — | $H_2SO_4$ (150 g/l) (blank reading) | — | RT | 60 | 2.7 | 27 (in aqueous phase) |

EXAMPLE 4

This example refers to the extraction of solid and/or water-suspended lead oxide, namely in the form of lead-(II) oxide (PbO) and the mixed lead(II/IV) oxide $Pb_3O_4$ (Mennige).

Test conditions:

0.5 molar solution of hydroxamic acid in Escaid® 100, on addition of water the ratio of organic to aqueous phase (O/A ratio) was 1:1, 1 hr agitation time at 60° C.;

metal concentration of the oxides 10 g/l of organic phase in each case.

Results:

Both for PbO and $Pb_3O_4$ a complete extraction of the lead into the organic phase took place.

EXAMPLE 5

The applicability of the process according to the invention for other metal oxides also is shown by the following extraction tests, in which the metal oxides are used partly in solid form, and partly suspended in water (added in the ratio 1:1) with different stirring times and temperatures. The amount of metal oxide used was selected so that the concentration of metal was 10 g/l of organic phase. The organic phase was a 0.5 molar solution of hydroxamic acid in the solvent Escaid® 100. The metal oxides were added in solid or in water-suspended form and the organic phase was added and vigorously stirred. Before the analysis of the organic phase, the latter was filtered. Table 5 below shows the results obtained.

TABLE 5

| Metal oxide | Addition in ratio 1:1 | Stirring time | Temp. °C. | g/l extr. metal in the org. phase | % extr. metal |
|---|---|---|---|---|---|
| $GeO_2$ | — | 60 | 60 | 4.3 | 43 |
| $GeO_2$ | water | 60 | 60 | 8.8 | 88 |
| CdO | — | 60 | RT | 6.1 | 61 |
| CdO | water | 60 | RT | 7.2 | 72 |
| HgO | — | 60 | RT | 0.6 | 6 |
| HgO | water | 60 | RT | 2.3 | 23 |
| $Cu_2O$ | — | 60 | RT | 6.5 | 65 |
| $MoO_2$ | — | 60 | RT | 5.6 | 56 |
| PbO | water | 60 | 60 | 10 | 100 |
| $Pb_3O_4$ | — | 60 | 60 | 8.4 | 84 |
| $Pb_3O_4$ | water | 60 | RT | 10 | 100 |
| PbO | water | 60 | RT | 9.2 | 92 |
| $V_2O_5$ | water | 60 | RT | 10 | 100 |
| $MnO_2$ | water | 60 | RT | 0.9 | 9 |
| $In_2O_3$ | water | 60 | 60 | 4.2 | 42 |

We claim:

1. In a process for the two-phase extraction of metal ions with a hydroxamic acid of the general formula (I)

$$R-\underset{\underset{}{\overset{O}{\|}}}{C}-NHOH \qquad (I)$$

in which R represents a straight-chain or branched, saturated or unsaturated alkyl radical with 5 to 21 carbon atoms, a cycloalkyl radical with 5 to 7 carbon atoms which is unsubstituted or substituted with $C_{1-6}$-alkyl groups, or a phenyl radical which is unsubstituted or substituted with $C_{1-12}$-alkyl groups, the improvement comprising (a) contacting a solid, finely distributed metal oxide of metals of main group III to V and of sub-group I, II and IV to VIII of the periodic system, wherein said finely distributed metal oxide is present as a solid phase or as a solid dispersed in a liquid phase, with an inert, water immiscible organic solvent containing at least one hydroxamic acid of the general formula (I) dissolved in an amount sufficient for the extraction of the metal ions, (b) intermixing the organic phase containing the hydroxamic acid with the phase containing the solid metal oxide for a sufficient time for the extraction of the metal ions, (c) separating the organic phase and the metal ions contained therein, and, (d) recovering the metal ions from the organic phase.

2. Process according to claim 1, wherein said organic solvent is a kerosene or mixtures of kerosenes.

3. Process according to claim 1 wherein said inert, organic solvent contains at least one hydroxamic acid of the general formula (I) in solution in a concentration of about 0.01 to about 2.0 mol/l of solvent.

4. Process according to claim 1 wherein the R group in at least one of the hydroxamic acids of the general formula (I) contained in said organic solvent is a saturated, branched alkyl radical with about 5 to about 21 carbon atoms.

5. Process according to claim 4, in which R represents a saturated, branched alkyl radical of the general formula (II)

$$R^2-\underset{\underset{R^3}{|}}{\overset{\overset{R^1}{|}}{C}}- \qquad (II)$$

in which the sum of the number of carbon atoms in the alkyl radicals $R^1$, $R^2$ and $R^3$ is from 6 to 18.

6. Process according to claim 1 wherein the metal oxides are present dispersed in an aqueous or mineral-acid phase.

7. Process according to claim 1, wherein the metal oxide is present as a solid phase, and is an oxide of metal selected from the group consisting of arsenic, antimony, bismuth, lead, germanium, cadmium, mercury, copper, molybdenum, vanadium, manganese, indium and mixtures thereof.

8. Process according to claim 6, wherein the metal oxide is dispersed in an aqueous phase and is an oxide of a metal selected from the group consisting of arsenic, antimony, bismuth, lead, germanium, cadmium, mercury, copper, molybdenum, vanadium, manganese, indium and mixtures thereof.

9. Process according to claim 6, wherein the metal oxide is dispersed in a mineral acid phase and is an oxide of a metal selected from the group consisting of arsenic, antimony, bismuth which exist dispersed in the and mixtures thereof.

10. Process according to claim 9, the oxide is present in sulfuric acid copper-refining electrolyte solutions in dispersed form.

11. Process according to claim 1 wherein the recovery of the extracted metal ions comprises mixing the organic phase with a sulfide precipitation agent and seperating the precipitated metal sulfides from the organic phase.

12. A process as defined in claim 11 wherein water is added to the organic phase before the sulfide precipitation.

13. A process as defined in claim 3, wherein said hydroxamic acid is present in a concentration of about 0.1 to about 1.0 mol/l of solvent.

14. A process as defined in claim 1, wherein said organic solvent is kerosene and contains a hydroxamic acid in a concentration of about 0.1 to about 1.0 mol/l of solvent.

15. A process as defined in claim 14, wherein the R group in said hydroxamic acid is a saturated branched, alkyl group having about 5 to about 21 carbon atoms.

16. A process as defined in claim 15 wherein the R group has about 7 to about 19 carbon atoms.

17. A process as defined in claim 16 in which the R group has the formula (II)

in which the sum of the number of carbon atoms in the alkyl radical $R^1$, $R^2$ and $R^3$ is from 6 to 18.

18. A process for extraction of metal ions from metal oxides comprising
(a) contacting a solid, finely divided, metal oxide of a metal from main groups III to V and of subgroups I, II and IV to VIII of the periodic system wherein said finely divided, metal oxide is present as a solid phase or dispersed in a liquid phase with an inert, water-immiscible organic solvent containing an hydroxamic acid in a concentration of about 0.01 to about 2.0 mol/l of organic solvent, in which said hydroxamic acid has the general formula (I)

in which R represents a straight-chain or branched, saturated or unsaturated alkyl radical with 5 to 21 carbon atoms, a cycloalkyl radical with 5 to 7 carbon atoms which is unsubstituted or substituted with $C_{1-6}$-alkyl groups, or a phenyl radical which is unsubstituted or substituted with $C_{1-12}$-alkyl groups,
(b) intermixing said organic phase containing the hydroxamic acid with the phase containing the solid, metal oxide, for a sufficient time to extract the metal ions,
(c) separating the organic phase now containing metal ions, and
(d) recovering the metal ions from the organic phase.

19. A process as defined in claim 18 wherein said oxide is an oxide of a metal selected from the group consisting of arsenic, antimony, bismuth, lead, germanium, cadmium, mercury, copper, molybdenum, vanadium, manganese, indium and mixtures thereof.

20. A process as defined in claim 18 wherein said oxide is an oxide of a metal selected from the group consisting of arsenic, antimony, bismuth and mixtures thereof and said oxide is present in a sulfuric acid copper-refining electrolyte solution in dispersed form.

* * * * *